(12) United States Patent
Ford

(10) Patent No.: US 6,304,694 B1
(45) Date of Patent: *Oct. 16, 2001

(54) METHOD AND DEVICE FOR ALIGNING OPTICAL FIBERS IN AN OPTICAL FIBER ARRAY

(75) Inventor: Joseph Earl Ford, Oakhurst, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,610

(22) Filed: Mar. 7, 1998

(51) Int. Cl.[7] ....................................... G02B 6/32
(52) U.S. Cl. ............................... 385/33; 385/34; 385/37; 385/35; 385/74
(58) Field of Search ................................. 385/31–35, 37, 385/38, 74, 93, 59; 65/386, 387, 243

(56) References Cited

U.S. PATENT DOCUMENTS

| | | | |
|---|---|---|---|
| 4,807,978 | * | 2/1989 | Grinberg et al. . |
| 5,241,612 | * | 8/1993 | Iwama ..................................... 385/74 |
| 5,281,301 | * | 1/1994 | Basavanhally .......................... 385/33 |
| 5,412,506 | * | 5/1995 | Feldblum et al. ...................... 385/33 |
| 5,790,730 | * | 8/1998 | Kravitz et al. ......................... 385/33 |
| 5,857,042 | * | 1/1999 | Robertson et al. .................... 385/33 |
| 5,862,278 | * | 1/1999 | Brauch et al. ......................... 385/35 |
| 5,951,731 | * | 9/1999 | Tsunetomo et al. .................... 65/61 |

* cited by examiner

*Primary Examiner*—Hemang Sanghavi
(74) *Attorney, Agent, or Firm*—Gibbons, Del Deo, Dolan, Griffinger & Vecchione

(57) ABSTRACT

A method and assembly for optically connecting a first grouping of optical fibers with a second grouping of optical fibers. To form the optical connection, the optical fibers in the first grouping and the second grouping are set into two separate arrays. A plurality of collimating elements are positioned proximate both arrays. The collimating elements correspond in both number and orientation to the optical fibers. As a result, any light signal emanating from either the first array or the second array will pass through a collimating element and will become substantially collimated. The first array and the second array are oriented with respect to one another so that each collimated element is at least partially aligned with a collimating element from the opposing array. Accordingly, light emitted from one fiber element in one array will be focused on an optical element in the opposing array without the optical fibers being precisely aligned.

10 Claims, 3 Drawing Sheets

METHOD AND DEVICE FOR ALIGNING OPTICAL FIBERS IN AN OPTICAL FIBER ARRAY

BACKGROUND OF THE INVENTION

1. Field of the Invention

The present invention relates to devices and methods that are used to accurately terminate optical fibers in a dense grouping so that those optical fibers can be aligned and connected to other optical fibers in a more space and labor efficient manner.

2. Description of the Prior Art

The prior art is replete with different devices and methods that are used to terminate groupings of optical fibers. In the past, optical fibers were most commonly joined either one fiber at a time or in ribbons that contain only a single row of optical fibers. As optical fiber networks become more complex, there are many instances where a large number of optical fibers in a bundle or a cable must be joined to another bundle or cable. Joining the optical fibers one fiber at a time or even one ribbon at a time is very time consuming and labor intensive. A need therefore exists for a method that would enable a greater number of optical fibers to be accurately terminated in a dense package so that those optical fibers can be more readily connected to other optical fibers with less labor.

One technique that can be used to terminate optical fibers in a dense package is to terminate a grouping of optical fibers in a two-dimensional array. Once terminated in a two-dimensional array, the optical fibers would terminate in a common plane while being arranged within fixed columns and rows. One two-dimensional array can then be connected with a similar array, thereby enabling a large number of fibers to be joined in a single operation.

A problem associated with terminating optical fibers in a two-dimensional array is that the manufacturing tolerances needed for the proper alignment of the optical fibers prohibits the structure of the two-dimensional array from being manufactured in a cost effective manner. When aligning optical fibers, the fibers must be aligned within only a few microns in order to produce an efficient transmission between optical fibers. For example, if two single mode fibers are laterally misaligned by only five microns, the coupling efficiency of the connection would only be 36% of a properly aligned connection. As a result, for two arrays to be connected, each must have a placement tolerance for the optical fiber on the order of one micron or less. In order to produce such an optical connector, exotic manufacturing techniques would have to be used, thereby resulting in a cost prohibitive connector.

A need therefore exists for a device and method that can be used to inexpensively and accurately terminate optical fibers in a dense two-dimensional array.

SUMMARY OF THE INVENTION

The present invention is a method and assembly for accurately terminating optical fibers in a two-dimensional array, thereby facilitating the interconnection of a first grouping of optical fibers to a second grouping of optical fibers. To form the two-dimensional array, optical fibers are set into place using conventional low cost manufacturing techniques. The result is an inaccurate two-dimensional array where the optical fibers terminate in a common plane while being oriented in multiple rows and columns. A plurality of collimating elements are positioned proximate the inaccurate array. The collimating elements correspond in both number and orientation to the optical fibers in the inaccurate array. As a result, any light signal emanating from the array will pass through a collimating element and will become substantially collimated. Different arrays can be oriented with respect to one another so that each collimated element is at least partially aligned with a collimating element from the opposing array. Accordingly, most of the light emitted from one fiber element in one array will be focused on an optical element in the opposing array without the optical fibers being precisely aligned.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
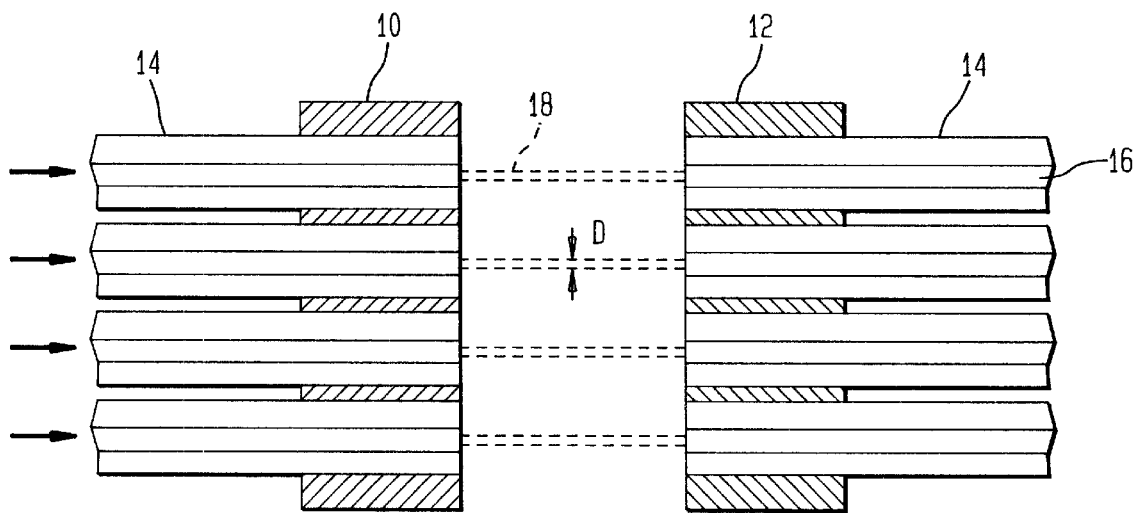
FIG. 1 is a schematic side view of two opposing arrays of optical fibers.

Referring to FIG. 1, there are shown two adjacent arrays 10, 12 of optical fibers 14. Each array 10, 12 is a two-dimensional array where optical fibers 14 are arranged in columns and rows. Each optical fiber 14 in the arrays 10, 12 has a core 16 that propagates light along an optical axis 18. Using conventional array bundling techniques, a two-dimensional array of optical fibers can be produced where the true position of each optical core axis 18 is within approximately twenty microns of its ideal design position. As result, the use of conventional manufacturing techniques results in two adjacent arrays where the optical core axis 18 of opposing optical fibers 14 will be misaligned by some distance D on the order of between approximately 0 microns and 40 microns.

Since the optical core axis 18 of the optical fibers 14 in each adjacent array can be misaligned by up to approximately twenty microns, the direct physical interconnection of the two arrays 10, 12 would result in a connection that does not pass light through all the fibers present. Rather, only some of the connections would pass light and only a small percentage of those connections would pass light without unacceptable losses due to misalignment.

Figure 2:
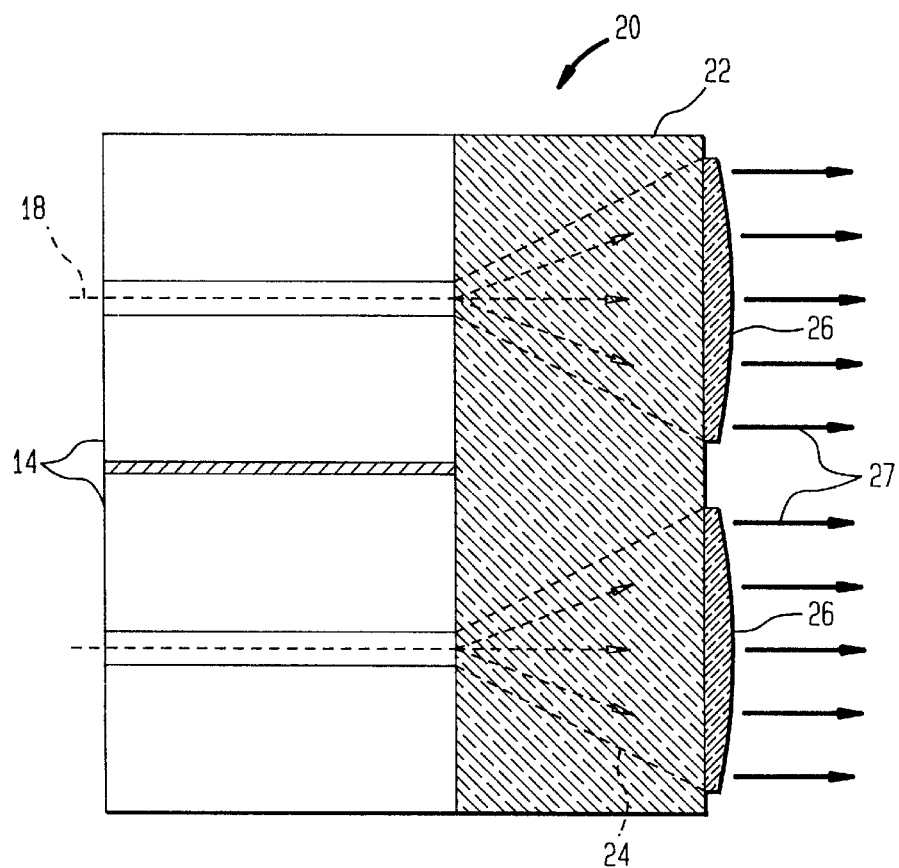
FIG. 2 is a schematic view or a section of an optical fiber array with collimating elements in accordance with the present invention.

Referring to FIG. 2, an arrangement 20 in accordance with the present invention is shown. In this arrangement, optical fibers 14 are fixed into an imperfect two-dimensional fiber array using traditional techniques. As such, the optical core axis 18 of each of the optical fibers 14 is typically within approximately twenty microns of proper alignment as was previously explained in regard to FIG. 1.

A lens array substrate 22 is placed in front of the imperfect fiber array. The lens array substrate 22 is a substrate that is transparent to the wavelength of light being propagate through the optical fibers 14. The lens array substrate 22 can be either formed directly on the imperfect fiber array or independently fabricated and attached to the face of the imperfect fiber array. As light is emitted by each of the optical fibers 14, the light spreads through the material of the lens array substrate 22, wherein the light follows the path of a projection cone 24. As a result, the light signal emitted from the core of each optical fiber 14 fills the projection cone 24, as that light signal propagates forward from the end of the optical fiber 14 to the face surface 23 of the lens array substrate 22. At the face surface 23 of the lens array substrate 22, the light projection cone has a maximum diameter D.

Lenslets 26 are disposed over the lens array substrate in the areas that correspond to the base of the projection cones 24. The optical axis of each lenslet 26 is optically aligned with the core axis 18 of a corresponding optical fiber 14. Each of the lenslets 26 are formed to have optical power, wherein the lenslets 26 serve to substantially collimate the light signal propagating through the projection cone 24 from the face of the optical fiber 14. The result is a generally collimated light signal 27 that propagates forward from each lenslet 26.

Since the light signal 27 emitted from each lenslet 26 is generally collimated, the transmitted light does not significantly diverge from or converge toward the optical axis of the lenslet 26. Accordingly, the distance that the light signal travels after being collimated is not critical within a certain range. The distance traveled by the collimated light can vary by a few millimeters without adversely affecting the quality of the light signal.

Figure 3:
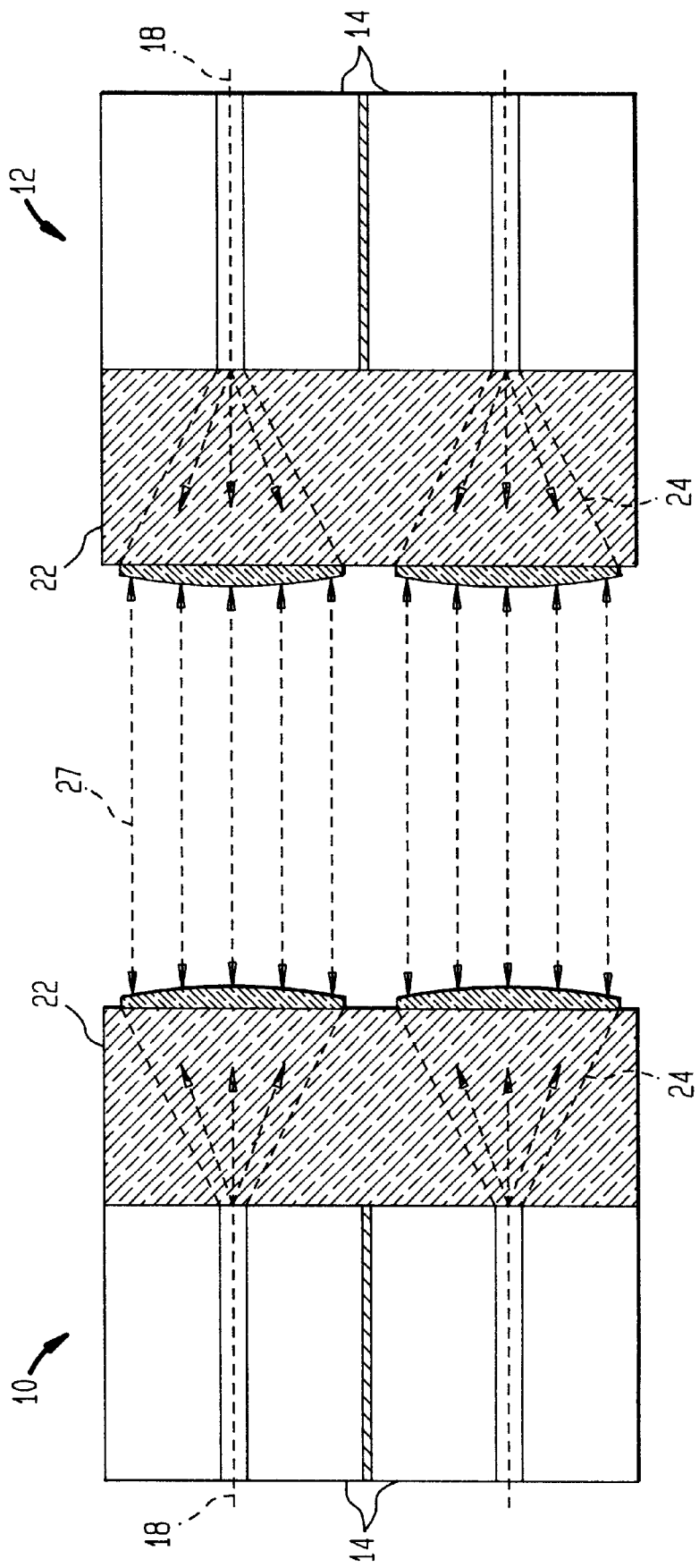
FIG. 3 is a schematic view showing the present invention assembly as light is directed from one optical fiber array to another.

Referring to FIG. 3, it can be seen that in an assembly having two opposing arrays, both opposing imperfect fiber arrays 10, 12 are fabricated using traditional low cost manufacturing techniques. A lens array substrate 22 is disposed in front of the optical fibers 14 and lenslets 26 are formed over projection cones 24 in front of the optical fibers 14. The optical axis of the lenslets 26 are aligned with the core of the optical fibers 14 to which they are physically attached. Accordingly, the optical axis 18 of the light emitting lenslet 26 (lefthand side of FIG. 3) is misaligned with the optical axis 18 of the light receiving lenslet 26 (righthand side of FIG. 3) by the same degree that the light emitting optical fiber 14 in the first array 10 is misaligned with the light receiving optical fiber in the second array 12.

Although any one light emitting lenslet 26 in the first array 10 may be misaligned with any one light receiving lenslet 26 in the second array 12 by up to forty microns, such misalignment is still relatively small as compared to the diameter of both the lenslets 26 and the collimated beam of light 27. The diameter of the lenslets 26 and the collimated beam of light 27 can be selectively varied by altering the thickness of the lens array substrate 22 behind the lenslets 26. For optimal tolerance to misalignment, the thickness of the lens array substrate 22 and the lenslet focal length should be selected so that the light signal expands to fill most of the space between adjacent fibers 14 in the array. These variables depend upon the core diameter of the optical fibers 14 and the wavelength of the light signal. For example, utilizing a standard transmission optical fiber at 1.55 μm, the light signal will expand to half of the fiber's 250 μm outer diameter after propagating through a lens array substrate 22 with a thickness of about 1.5 mm.

As the collimated light signal 27 travels from the emitting lenslet 26 of the first array 10 and impinges upon the receiving lenslet 26 of the second array 12, the optical axis of the collimated beam will be misaligned with the optical axis of the receiving lenslet. However, the majority of the area of light that is the collimated beam 27 does impinge upon the receiving lenslet. The receiving lenslet 26 focuses that light onto the adjacent optical fiber. The only light that is lost is the light contained within the collimated beam 27 that does not impinge upon the receiving lenslet. For the large majority of tolerance misalignments, the amount of light lost is less than 10% of the possible transmission. As such a light transmission efficiency of over 90% is commonly achieved between optical fibers bound in low cost arrays.

The lenslets 26 can be either refractive or diffractive elements. To produce refractive lenslets a variety of different lithographic fabrication techniques can be used. For example, the lenslets can be fabricated utilizing ion diffusion and surface profile etching. The process involves depositing photoresist on the lens array substrate 22 (FIG. 2). Light is passed through the optical fibers, thereby imaging the photoresist in front of each of the optical fibers. The photoresist is developed and the unimaged photoresist is removed. This produces a pattern of circular disks that correspond to the placement of optical fibers in the array. The photoresist is then caused to reflow. As the photoresist reflows, surface tension causes the circular disks to form into semicircles which can act as the lenslets.

In an alternative manufacturing technique, a photoresist coated blank is exposed to light from the array. After development, the blank is a mirror image of the array. The blank is then used as an etching mask on the lens array substrate 22 (FIG. 2). Utilizing the mask, depressions can be etched into the face of the lens array substrate. The depressions can then be used to retain ball lenses, wherein the ball lenses act as the lenslets.

Yet another method of forming refractive lenslets would be to form the lenslets directly on the face of the optical fibers. The tips of the optical fibers can be etched to create a desired hemispherical surface. The tips of the optical fibers can then be ion-diffused to create a needed gradient index profile.

Figure 4:
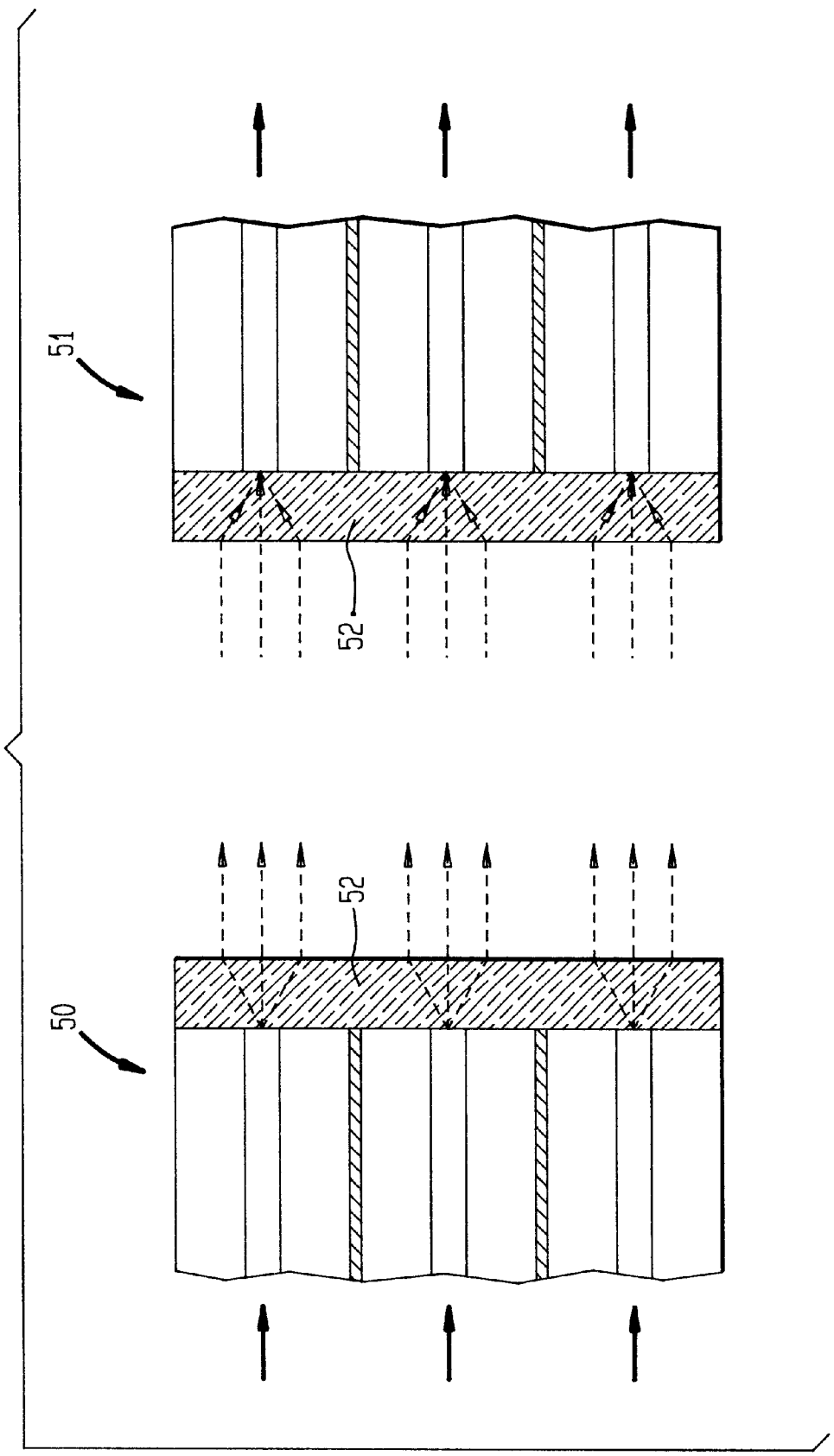
FIG. 4 is a schematic view of an alternate embodiment of collimating elements on an optical fiber array in accordance with the present invention.

An alternative to creating refractive lenslets for the optical fibers in the array is to create a diffractive element for each of the optical fibers. Referring to FIG. 4 it can be seen that a substrate 52 is positioned in front of each array 50, 51 of optical fibers. The substrate can either be made of material capable of recording a hologram or can be coated with a material capable of recording a hologram. In the shown embodiment, the substrate itself is fabricated from a material suitable for recording a hologram. A hologram is recorded in the material of the substrate 52. As a light signal passes through the substrate 52 from the first array 50, the light signal is collimated by the holographic recording present. Similarly, when the collimated light strikes the substrate 52 on the opposing array 51, the hologram recorded in the substrate 51 focuses the light signal onto the optical fibers.

The hologram recorded in the substrate 52 is produced from the interference pattern of the output of the optical fibers and a plane wave reference beam. The desired hologram is recorded with the reflected plane wave. The substrate 52 can be a photopolymer, which can be developed in place on the optical fiber arrays. Alternatively, dicromated gelatin or bleached film can be used. However, such substrates would have to be attached to the optical fiber array after being recorded.

In the embodiments shown of the present invention, an array of optical fibers was illustrated and described. It will be understood that arrays of other light emitting elements can also be aligned using the devices and methods of the present invention. For example, an array of light emitting diodes can be aligned with an array of photodetectors by placing collimating elements in front of both arrays and roughly aligning the collimating elements. It should therefore be understood that the present invention need not be limited to uses in the field of optical fibers.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. An assembly for optically interconnecting a first grouping of optical fibers to a second group of optical fibers, said assembly comprising;
   a first array for retaining each of the optical fibers in said first group in a fixed position;
   a second array for retaining each of the optical fibers in said second grouping in a fixed position;
   a first plurality of collimating element proximate the first fixed array, wherein one of said plurality of collimating elements is optically aligned with each optical fiber in said first fixed array, the location of said first plurality of collimating elements being created by the light output from said first grouping of optical elements;
   a second plurality of collimating elements proximate said second fixed array, wherein one of said plurality of collimating elements is optically aligned with each optical fiber in said second fixed array, the location of said second plurality of collimating elements being created by the light output from said first plurality of collimating elements, wherein, each of said first plurality of collimating elements at least partially aligns with one of said second plurality of collimating elements.

2. The method according to claim 1, wherein said step of creating a first plurality of collimating elements include fabricating said first plurality of collimating elements on said first fixed array, location of said collimating elements being optically recorded on a substrate proximate said grouping of optical elements to precisely align said optical elements with said collimating elements.

3. The method according to claim 1, wherein said first plurality of collimating elements and said second plurality of collimating elements are refractive lenslets.

4. The method according to claim 1, wherein said first plurality of collimating elements and said second plurality of collimating elements are holographic diffractions.

5. A method of manufacturing an optical assembly, comprising the steps of:
   orienting a plurality of optical fibers in an array having a plurality of rows and a plurality of columns;
   creating a plurality of collimating elements proximate said array wherein each of said collimating elements is optically aligned with one of said optical fibers in said array and substantially collimates light emitted by each of said optical fibers, said collinators being created by the light output from said optical fibers included in said array.

6. The method according to claim 5, wherein said step of setting a plurality of collimating elements includes the step of forming said plurality of collimating elements on a substrate and affixing said substrate to said array, said substrate having utilized an optically recordable medium thereon to positionally create the location of said collimating elements based on said light output from said optical fibers included in said array structure.

7. The method according to claim 6, further including the step of forming projection cones of light in said substrate between each of the collimating elements and the optical fibers in said array.

8. The method according to claim 5, wherein said plurality of collimating elements are selected from a group consisting of refractive lenslets and diffractive holograms.

9. The method according to claim 5, wherein said plurality of collimating elements are created on said fixed array.

10. The method according to claim 5, wherein each of the optical fibers in said fixed array have a predetermined diameter and said plurality of collimating elements are sized and positioned to produce collimated beams having a diameter less than said predetermined diameter.

* * * * *